United States Patent Office 3,595,951
Patented July 27, 1971

3,595,951
PROCESS FOR SPINNING POLY(p-BENZAMIDE)
Francis M. Logullo, Wilmington, Del., assignor to E. I. du Pont de Nemours and Company, Wilmington, Del.
No Drawing. Filed June 27, 1969, Ser. No. 837,349
Int. Cl. D01f 1/02
U.S. Cl. 264—211
10 Claims

ABSTRACT OF THE DISCLOSURE

Poly(p-benzamide) dope containing about 1 to 10 percent based upon the weight of polymer, of a modifier of the formula (I)

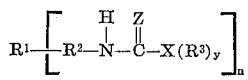

wherein $R^1$ is an aliphatic or aromatic hydrocarbon radical having a valence of $n$,
$R^2$ is a single bond or a divalent aromatic hydrocarbon radical,
$R^3$ is a monovalent aliphatic or aromatic hydrocarbon radical,
X is a divalent oxygen (—O—) or sulfur (—S—) radical, or a trivalent nitrogen (—N<) radical,
$y$ is 1 or 2,
$n$ is an integer between 2 and 4, inclusive, and
Z is a divalent oxygen (=O) or sulfur (=S) radical, is extruded to form a shaped article and the article is heated for up to 160 hours at 190 to 250 °C. This process improves the tenacity and modulus of the shaped article, as well as increasing the inherent viscosity of the polymer, without adversely affecting other desirable properties, e.g., elongation, to any appreciable extent.

BACKGROUND OF THE INVENTION

The high tenacity and initial modulus exhibited by fibers of poly(p-benzamide) make them desirable for a wide variety of end uses. Although the tensile properties of the fibers are excellent, further improvements are desirable for particular end uses, such as reinforcement, e.g., in composites with organic resin matrices. One technique for improving the properties of these fibers is heat treatment, e.g., heating the fibers at 300–1000° C. for 5 minutes to 0.1 second. Although this technique provides higher tensile strength and modulus values, the high temperature required (above about 300° C.) may adversely affect other fiber properties, particularly elongation.

The present invention provides a method for improving the tenacity and modulus of poly(p-benzamide) shaped articles without adversely affecting other desirable properties, e.g., elongation, to any appreciable extent. The present invention further provides an increase in the inherent viscosity of the polymer.

SUMMARY OF THE INVENTION

The present invention is a process for improving the properties of poly(p-benzamide) shaped articles comprising:

(1) Providing a poly(p-benzamide) dope containing about 1 to 10 percent, based upon the weight of polymer, of a modifier of the formula:

(I)

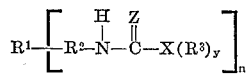

wherein:

$R^1$ is an aliphatic or aromatic hydrocarbon radical having a valence of $n$,
$R^2$ is a single bond or a divalent aromatic hydrocarbon radical,
$R^3$ is a monovalent aliphatic or aromatic hydrocarbon radical,
X is a divalent oxygen (—O—) or sulfur (—S—) radical, or a trivalent nitrogen (—N<) radical,
$y$ is 1 or 2, and
$n$ is an integer between 2 and 4, inclusive, and
Z is a divalent oxygen (=O) or sulfur (=S) radical.

(2) Extruding the dope to form a shaped article, and
(3) Heating the shaped article for up to 160 hours at 190 to 250° C.

DETAILED DESCRIPTION OF THE INVENTION

Polymers

Poly(p - benzamide), also known as poly(1,4 - benzamide) and its preparation are described in French Pat. No. 1,526,745. The polymer comprises at least about 80 mol percent of repeating units of the formula:

(II)

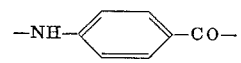

Poly(p-benzamide) suitable for the preparation of useful shaped articles (e.g., self-supporting films) exhibits an inherent viscosity greater than about 0.7 (greater than about 0.8 is generally required for fibers) preferably above 2.0, measured as described hereinafter. The polymer may be obtained by the low temperature solution polymerization of p-aminobenzoyl halide salts of the formula:

(III)

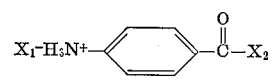

wherein $X_1$ represents a member selected from the group consisting of arylsulfonate, alkylsulfonate, acid sulfate, and halogen radicals, preferably bromide or chloride radicals, and $X_2$ represents a halogen radical preferably bromide or chloride. p-Aminobenzoyl chloride hydrochloride is the monomer preferred. Other monomers suitable for this purpose are p-aminobenzoyl bromide hydrobromide, p-aminobenzoyl chloride hydrobromide, p-aminobenzoyl chloride methanesulfonate, p - aminobenzoyl chloride benzenesulfonate, p-aminobenzoyl chloride toluenesulfonate, p-aminobenzoyl bromide ethanesulfonate, and p-aminobenzoyl chloride acid sulfate. Other monomers not within Formula III, e.g., p-aminobenzoyl chloride sulfate are also suitable. The preferred p-aminobenzoyl chloride hydrochloride may be prepared in high yield from an ethereal solution of p-thionylaminobenzoyl chloride by the general procedure of Graf and Langer, J. prakt. Chem. 148, 161 (1937) under anhydrous conditions. The drying and anhydrous storage of this monomer are preferably performed under room temperature conditions because of the tendency for the compound to polymerize at higher temperatures.

A wide variety of suitable comonomers (up to about 20 mol percent) may be utilized. Among the suitable comonomers may be named m-aminobenzoyl chloride hydrochloride (which results in the recurring unit

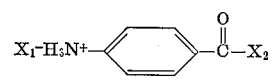
)

and p-phenylenediamine and terephthaloyl chloride (which together results in the recurring unit

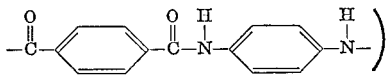
)

Other suitable comonomers are described in the aforementioned French patent.

Solvents which are suitable for the polymerization reaction include those selected from the group consisting of:

N,N,N',N'-tetramethylurea,
hexamethylphosphoramide,
N,N-dimethylacetamide,
N-methylpyrrolidone-2,
N-methylpiperidone-2,
N,N'-dimethylethyleneurea,
N,N,N',N'-tetramethylmalonamide,
N-methylcaprolactam,
N-acetylpyrrolidine,
N,N-diethylacetamide,
N-ethylpyrrolidone-2,
N,N-dimethylpropionamide,
N,N-dimethylisobutyramide,
N,N-dimethylbutyramide, and
N,N'-dimethylpropyleneurea.

Salts, such as lithium chloride, may be added to the polymerization reaction mixture; such addition may assist in the maintenance of a fluid mixture.

Chain terminators, as indicated above, may be used in these polymerizations, although such use is not essential herein. By assisting in the control of the molecular weight of the polyamide, the use of chain terminators contributes to the ease by which subsequent processing of the polymer occurs and enhances stability of the polymer dope for application in the "coupled" polymerization spinning process of the in situ formed polymer. The chain terminator must be chosen so that the resulting polymer end-cap can react with the modifier during the heat treatment described hereinafter. When no chain terminator is used, the polymer chain ends are essentially

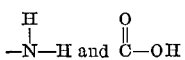

groups. As long as the chain terminator used and the amount thereof leaves a substantial number of these groups at the ends of the polymer chain, or groups which undergo bond-forming reactions with isocyanate groups, e.g.,

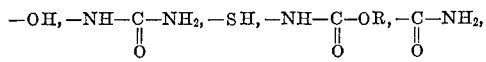

the polymer will be suitable for use in the process of this invention. Among the suitable chain terminators are the following compounds which can react monofunctionally with the acid chloride ends of these polyamides such as p-aminobenzoic acid, ammonia, monoamides (e.g., methylamine, dimethylamine, ethylamine, butylamine, dibutylamine, cyclohexylamine, aniline, etc.), compounds containing a single amide-forming group, such as N,N-diethylethylenediamine, hydroxylic compounds such as methyl alcohol, ethyl alcohol, isopropyl alcohol, phenol, water, etc., and monofunctional compounds which can react with the amine ends of the polyamides such as other acid chlorides (e.g., acetyl chloride), acid anhydrides (e.g., acetic anhydride and isocyanates) (e.g., phenyl isocyanate, m-tolyl isocyanate, ethyl isocyanate, etc.). Useful difunctional terminators include terephthaloyl chloride, isophthaloyl chloride, sebacyl chloride, 4,4'-biphenyldisulfonyl chloride, p-phenylenediisocyanate, benzidine diisocyanate, bis(4-isocyanatophenyl)methane, p-phenylenediamine, m-phenylenediamine, benzidine, bis(4-aminophenyl) ether, N,N'-diaminopiperazine, adipic dihydrazide, terephthalic dihydrazide and isophthalic dihydrazide.

The polymerization reaction may be carried out by dissolving the desired monomer or monomers (as well as the chain terminating agent and lithium chloride, if any is used) in the desired amide or urea solvent and vigorously stirring the resulting solution, externally cooled, until it develops into a viscous solution or a thick gel-like mass. Alternatively, the desired monomer may first be slurried in a small quantity of an anhydrous, inert organic liquid, such as tetrahydrofuran, dioxane, benzene or acetonitrile, prior to the addition of the amide solvent. Preferably, the resulting monomer/organic liquid mixture is stirred at an increased rate and a relatively large volume of the amide solvent is rapidly added. In a further variation, the amide solvent may be frozen and mixed, while frozen, with the desired monomer, the solvent is permitted to thaw and the resulting mixture stirred until a viscous solution or gel-like mass forms.

In each of the above techniques, the polymerization reaction is maintained at low temperatures, i.e., under 60° C. and preferably from —15° C. to +30° C., by external cooling, if necessary. The reaction mixture is stirred continuously until it gradually develops into a viscous solution or thick gel-like mass. The reaction is generally allowed to proceed a period of from about 1 to 48 hours, preferably from about 2 to 24 hours.

For the attainment of the highest molecular weights, these polymerizations are performed under strictly anhydrous conditions. The reaction vessel and auxiliary equipment, solvents, and reactants are carefully dried prior to use and the reaction vessel is continuously swept with a stream of dry, inert gas, e.g., nitrogen, during the polymerization.

The polymerization reaction produces an acidic by-product (e.g., HCl or HBr) which is preferably neutralized. Neutralization is especially preferred in embodiments hereinafter described wherein the reaction mixture is prepared for direct use in forming shaped articles of the polymer. In such a situation, it is preferred to add a base selected from the group consisting of:

lithium carbonate,
lithium oxide,
lithium hydroxide,
lithium hydroxide monohydrate,
lithium hydride,
calcium oxide,
calcium hydroxide, and
calcium hydride, or mixtures thereof, to neutralize the reaction mixture. The use of a neutralization agent is highly desired, in that the acid may cause significant corrosion problems in processing equipment (e.g., the spinneret). Neutralization may also be necessary to achieve more fluid compositions which facilitate the formation of shaped articles. If more than the stoichiometric amount of neutralizing agent is used, an insoluble excess may remain. Its removal may be required prior to forming a shaped article (e.g., by spinning). The neutralizing agent may be added before, shortly after, or long after monomer is added to the reaction medium depending upon the inherent viscosity desired. Addition of neutralizing agent may result in a sharp increase in polymer molecular weight as determined by measuring the inherent viscosity of polymer isolated from an aliquot of the reaction mixture before and after neutralization.

In addition to excess neutralization agents, the dopes may contain other insoluble material which preferably should be removed, by conventional means, prior to forming a shaped article. For example, when the acidic polymerization system produces bromide ion and lithium hydroxide is used as a neutralizing agent, the lithium bromide produced may be insoluble in particular dopes and should be removed before the dope is spun or cast.

The composition may be concentrated under vacuum to produce a fluid of the desired solids content and/or viscosity for spinning or casting, under the conditions discussed hereinafter.

To isolate the polymer, the polymerization mixtures is combined with a polymer nonsolvent, e.g., water in a suitable blender, and thereby is converted to a powder. The powdered polymer, after being washed with both water and alcohol, is dried overnight in a vacuum oven at about 60°–90° C. before being stored or treated for subsequent processing.

Modifiers

Prior to being formed into shaped objects, e.g., fibers, the poly(p-benzamide) dope is combined with between 1 and 10 weight percent, based on the weight of the polymer, of a modifier having the Formula I as defined hereinbefore.

Among the preferred modifiers may be named triethyl benzene-1,3,5-tricarbamate, di-n-octyl methylenebis(p-phenylene thiocarbamate) and diphenyl p-phenylene dicarbamate. Among the numerous other suitable modifiers, preferred modifiers $R^1$, $R^2$ and $R^3$ (as defined in Formula I above) each containing up to 12 carbon atoms, and Z being oxygen.

When X in Formula I is —O— or —S—, $y$ is 1; when X is —N<, $y$ is 2.

It is preferred for many end uses that $n$ equal 2 because the polymer remains linear. If $n$ equals 3 or 4, a cross-linked polymer results.

The modifiers may be conveniently prepared by reacting a polyfunctional isocyanate or isothiocyanate with a monofunctional compound containing a "labile" hydrogen atom. Preferred reactants are amines, thiols, phenols, alcohols, ureas, amides and oximes.

The modifiers are preferably added to the dope containing the poly(p-benzamide). However, the modifier may be added at an earlier stage (e.g., during the polymerization) as long as the conditions (e.g., heat) do not cause the modifier to be converted. Although the invention is not to be limited by the theory involved, under the heat treatment conditions it is believed that the modifiers of this invention are converted into polyvalent isocyantes (when X is oxygen) or polyvalent isothiocyanates (when X is sulfur). These in turn would react with the ends of the polymer chain,

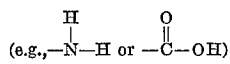

to link the polymer chains together. Therefore as long as the conditions (e.g., temperature) prior to extrusion of the dope do not convert the modifier and cause it to prematurely react (e.g., with the monomer or low polymer), the addition may be made at any convenient stage in the process.

Dope preparation

Shaped articles such as fibers and films may be formed directly from neutrailized reaction mixtures comprising the poly(p-benzamides), liquid media and the modifiers. The polymer may be formed in situ in a suitable liquid medium, preferably, N,N-dimethylacetamide; N,N,N',N'-tetramethylurea; N,N-dimethylisobutyramide; N - methylpyrrolidone-2; or N,N'-dimethylethylene urea are also suitable. Use of one of the lithium bases (e.g., lithium carbonate) for neutralization is preferred.

The poly(p-benzamides) may also be isolated in bulk form and converted into shaped articles by first incorporating them in dopes containing the modifier and then extruding the dope into fibers, casting it into films, etc. These dopes are essentially comprised of a least about 4% by weight of poly(p-benzamide) and a suitable liquid amide medium (preferably as stated above), most preferably containing lithium chloride or calcium chloride. Significant variables in dope preparation are polymer inherent viscosity, polymer crystallinity, polymer particle size, type of liquid medium, type of salt, salt concentration, and dope preparation technique. In general, the maximum polymer content possible in the dope decreases as the inherent viscosity of the polymer increases; preferably, isolated bulk polymer is finely divided (e.g., comminuted by ball milling) prior to combining it with the amide medium and the salt. Dopes preferably contain from about 4 to about 25 weight percent (preferably 4 to 8 weight percent) of poly(p-benzamide), the modifier, at least about 2.5 weight percent of salt (a lithium chloride range from about 4 to about 7% is preferred and about 5 to 8% by weight for calcium chloride), and the balance is one or more appropriate amides. Salt in excess of about 20 weight percent is generally neither necessary nor desired; less than 15 weight percent of salt is preferred. Preferred liquid media useful for preparing dopes containing calcium chloride include N,N-dimethylacetamide, N,N-diethylacetamide, N-methylpyrrolidone-2, N-methylpiperidone-2, N-ethylpyrrolidone-2, N-methylcaprolactam, N-acetylpyrrolidine, N-acetylpiperidine, N,N'-dimethylethyleneurea, and N,N'-dimethylpropyleneurea. In addition to the above-cited liquid media, preferred liquid media useful for preparing dopes containing lithium chloride also include N,N-dimethylpropionamide, N,N-dimethylbutyramide, N,N-dimethylisobutyramide, and N,N-dimethylmethoxyacetamide. N,N-dimethylacetamide is most preferred.

Useful dopes comprising the poly(p-benzamide), the modifier, lithium or calcium chloride and one or more of the above-cited liquid media may be prepared in a variety of ways. Dopes useful for spinning into fibers may be prepared at room temperature conditions; other dopes require specific heating techniques. Clear flowable compositions may be obtained at room temperature, in some instances while heating, preferably with stirring, and sometimes heating and cooling cycles are required in other instances. The amount of heating and/or cooling required to form by this method a composition with the flow characteristic needed for smooth spinning of fibers varies with the inherent viscosity, the crystallinity, and the particle size of the polyamide sample employed, as well as with the quality of the stirring action.

The poly(p-benzamide) dopes utilized in this invention may comprise a single anisotropic phase, a single isotropic phase, or an emulsion of anisotropic and isotropic phases in any proportion or degree of dispersion. Minute quantities of undissolved polymer may be present in these phases or in the emulsion, particularly when the dope is prepared by dissolving isolated polymer. A "dope" is a shaped-structure-forming (e.g., fiber-forming, film-forming, or fibrid-forming) polymer-solvent system which comprises at least one of the above phases.

Shaped article preparation

Dopes prepared as described above may be extruded into fibers by conventional wet- and dry-spinning techniques and equipment. In wet-spinning, and appropriately prepared spinning dope whose temperature may vary from 20 to about 100° C., is extruded into a suitable coagulating bath, e.g., a water bath maintained at 5–90° C., depending upon the solvent. Other useful coagulants include ethylene glycol, glycerol, mixtures of water and alcohol, and aqueous salt baths. Dry spinning may be accomplished by extruding the dope, preferably maintained at about 85–125° C., into a heated current of gas whereby evaporation occurs and fibers are formed.

After being formed, the fibers may be passed over a finish-application roll and wound up on bobbins. Development of maximum levels of fiber and yarn properties is assisted by soaking the bobbins in water or mixtures of water and water-miscible inert organic liquids (e.g., acetone, ethyl alcohol, glycerol, N,N-dimethylacetamide, N,N,N'N'-tetramethylurea) to remove residual amide liquid and salt after which the fibers are dried. Removal of the salt and amide liquid may also be accomplished by passing the fiber or yarn through aqueous baths on the run, by flushing the bobbins with water as the yarn is formed, and by soaking or washing skeins, rather than bobbins of yarn.

The poly(p-benzamide) dopes may be formed into strong, self-supporting films by conventional wet-extrusion methods. Such films are usually kept under restraint when they are subsequently dried and washed.

Heat treatment of the modified shaped articles

Heat treatment is preferably carried out on shaped articles, since the reaction of the bulk polymer with the modifier may result in a cross-linked, intractable gel. The reaction between modifier and polymer is achieved by heating the fibers or other shaped articles at temperatures between about 190 and 250° C. for up to 160 hours, the longer times being employed at lower temperatures. Generally at least about 20 hours of heating is preferred.

It is preferred that the shaped article be heated in an inert atmosphere (e.g., nitrogen) although other media (e.g., air) are also suitable. Hot air ovens, hot pins, hot slots, hot plates and liquid heating baths are useful for such treatments.

The shaped articles are subjected to the heat treatment while under tension or slightly drawn. Drawing may vary from essentially none to as much as 25% or more depending on the shaped article history and composition.

Property improvement in shaped articles

The tenacity and initial modulus of the poly(p-benzamide) shaped articles, modified as described herein, are substantially increased compared to values for untreated control fibers. Additionally, the inherent viscosity of polymer increases by as much as 100 percent during the heat treatment. Most significantly, this improvement is achieved without adversely affecting other desirable properties, e.g., elongation to any appreciable extent. The present invention's retention of a large portion of the shaped articles' original (i.e., before heat treatment) elongation, makes such articles, e.g., fibers, highly useful as a reinforcing agent for relatively elastic media, e.g., rubber.

Measurements and tests

The inherent viscosity ($\eta_{inh}$) of the polymers is calculated using the equation:

$$\eta_{inh} = \frac{\ln \eta_{rel}}{C}$$

The relative viscosity ($\eta_{rel}$) is determined by dividing the flow time in a capillary viscometer of a dilute solution of the polymer by the flow time for the pure solvent. The concentration (C) used in the examples is 0.5 gram of polymer per 100 cc. of concentrated (95–98% by weight) aqueous sulfuric acid solution and the temperature is 30° C.

Shaped article (e.g., fiber) properties of tenacity, elongation and initial modulus are coded as $T/E/M_i$ and are reported in their conventional units, grams/denier, percent, grams/denier, respectively.

EXAMPLES

The following non-limiting examples illustrate several of the preferred embodiments of this invention. Parts and percentages are by weight unless otherwise indicated.

Example I

This example illustrates the use of triethylbenzene-1,3,5-tricarbamate

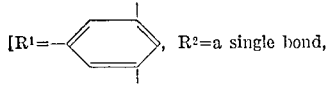

$R^3=C_2H_5-$, $X=-O-$, $y=1$, $n=3$ and $Z=(=O)$ in Formula I]

modifier for fibers of poly(p-benzamide).

A 1-liter capacity resin kettle is dried using a flame filled with dry nitrogen and equipped with a basket-type stirrer, drying tube, and nitrogen inlet. A 500 cc. portion of N,N-dimethylacetamide (DMAc) is added to the flask after which the flask is thoroughly chilled by immersing it in an ice-water bath. A 48-gram portion of p-aminobenzoyl chloride hydrochloride is added in one portion with rapid stirring. The ice bath is removed after one hour and after an additional hour a 16.7 gram-portion of lithium carbonate is added. Stirring is continued over a two-day period to yield a dope that is suitable for extrusion. A sample of the resultant polymer is isolated for inherent viscosity measurement by precipitation in a commercial blender using water. The precipitated polymer is washed three times with water and then dried at about 110° C. under reduced pressure. The isolated polymer exhibits an inherent viscosity of 2.11, measured as described hereinbefore.

The polymer dope is extruded into a 6-foot long water bath wherein the temperature is 50° C. The spinneret contains 240 holes, 0.0025 inch (0.0063 cm.) in diameter. The pump speed is 7.5 r.p.m., the pressure is 13–17 p.s.i. (900–1200 grams/cm.²) and the windup speed is 100–114 ft./min. (30–35 meters/min.). The resultant fibers are soaked overnight in distilled water and dried in air.

A second dope is prepared using the same reagents and procedure, with the exception that 1.7 grams of triethylbenzene-1,3,5-tricarbamate is added, and the dope is then extruded as described for the unmodified control. The preparation of this modifier is described by J. E. Gill et al. [J. Chem. Soc. (1949) 1753]. The polymer exhibits an inherent viscosity of 1.83 and the fiber properties, $T/E/M_i$, are 6.3/8.2/288. The fibers are wound on a metal bobbin and heat-treated at a temperature of 200° C. under a nitrogen atmosphere for 66 hours. The inherent viscosity of the polymer is 3.83 and the fibers' properties, $T/E/M_i$ are 9.4/7.6/373.

Prior to the heat treatment the unmodified control polymer exhibits an inherent viscosity of 2.00 and the fiber properties, $T/E/M_i$, are 6.7/8.6/278. Following the heat treatment the inherent viscosity of the polymer is 2.04; the $T/E/M_i$ of the fibers are 5.6/3.5/300.

Example II

This example illustrates the use of a larger amount of the same modifier as illustrated in Example I.

The procedure of Example I is repeated except that 2.17 grams of triethyl benzene-1,3,5-tricarbamate is added to the dope. The fibers exhibit an inherent viscosity of 2.33 and a $T/E/M_i$ of 9.1/7.6/413. The fibers are wound on a metal bobbin and heat-treated at a temperature of 200° C. under a nitrogen atmosphere for 64 hours. The fiber, after this heat treatment, exhibits an inherent viscosity of 3.44 and a $T/E/M_i$ of 12.7/7.8/429.

Example III

This example illustrates the use of di-n-octyl methylene-bis-(p-phenylene thiocarbamate)

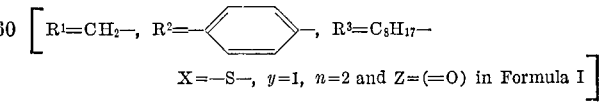

X=—S—, $y=1$, $n=2$ and Z=(=O) in Formula I]

modifier for fibers of poly(p-benzamide).

Poly(p-benzamide) and a dope thereof are prepared as described in Example I. About 2.77 grams of the modifier, dioctamethylene - bis - (p - phenylene thiocarbamate), is added to the dope. The modifier is prepared adding 1-octanethiol (100 cc.) dropwise, with stirring, to methylene bis-(p-phenyl isocyanate) (50 g.) in tetrahydrofuran (500 cc.). After stirring at ambient temperature over two days, about 400 cc. of the solvent is removed under a stream of nitrogen and 300 cc. hexane added. The product is filtered washing with hexane; uncorr. M.P. crude product is 148–149°. Two recrystallizations from benzene give 84 g. of the thiocarbamate uncorrected M.P. 149–150°. The dope is extruded, as described in Example I to yield fibers exhibiting an inherent viscosity of 2.55 and a $T/E/M_i$ of 9.0/9.6/308. After heat-treatment as described in Example II, the inherent viscosity of the polymer is 2.89 and fiber $T/E/M_i$ is 12.0/6.8/426.

Example IV

This example illustrates the use of diphenyl p-phenylene dicarbamate

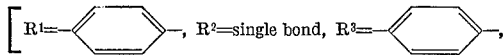

modifier for fibers of poly(p-benzamide).

Poly(p-benzamide) and a dope thereof are prepared as described in Example I, except that 51 grams of monomer, 500 cc. of DMAc and 19 grams of lithium carbonate are used. About 1.88 grams of the modifier, diphenyl p-phenyl dicarbamate, is added to the dope. The preparation of this modifier is described by L. C. Raiford et al. [J. Org. Chem. 7, 346 (1942)]. The dope is extruded, as described in Example I to yield fibers exhibiting an inherent viscosity of 2.51. The fibers are wound on a metal bobbin and heated at a temperature of 184–196° C. under a nitrogen atmosphere for 20 hours. The fiber, after this heat-treatment, exhibits an inherent viscosity of 3.37

TABLE I

| Example | T/E/M_i As-spun | T/E/M_i Heat treated | η_inh As-spun | η_inh Heat treated | Heat treatment Temperature (° C.) | Heat treatment Time (hours) |
|---|---|---|---|---|---|---|
| I—Control | 6.7/8.6/278 | 5.6/3.5/300 | 2.0 | 2.04 | 200 | 66 |
| I | 6.3/8.2/288 | 9.4/7.6/373 | 1.83 | 3.83 | 200 | 66 |
| II | 9.1/7.6/413 | 12.7/7.8/429 | 2.33 | 3.44 | 200 | 64 |
| III | 9.0/9.6/308 | 12.0/6.8/426 | 2.55 | 2.89 | 200 | 64 |
| IV | —/—/— | —/—/— | 2.51 | 3.37 | 184–196 | 20 |

Table I summarizes the $T/E/M_i$ and inherent viscosity of the fibers of the preceding examples, measured prior to and following the heat treatment. The temperature and duration of the heat treatment is also stated.

As these results illustrate, a desirable increase in tenacity and modulus is obtained, along with an increase in inherent viscosity compared to an unmodified control. Significantly elongation is not adversely affected to any appreciable extent.

What is claimed is:

1. A method for improving the properties of poly(p-benzamide) shaped articles comprising
   (1) providing a poly(p-benzamide) dope containing about 1 to 10 percent, based upon the weight of polymer, of a modifier of the formula:

(I)

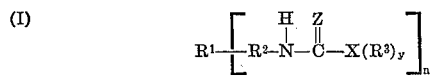

wherein:
R¹ is an aliphatic or aromatic hydrocarbon radical having a valence of $n$,
R² is a single bond or a divalent aromatic hydrocarbon radical,
R³ is a monovalent aliphatic or aromatic hydrocarbon radical,
X is a divalent oxygen (—O—) or sulfur (—S—) radical, or a trivalent nitrogen (—N<) radical,
$y$ is 1 or 2,
$n$ is an integer between 2 and 4, inclusive, and
Z is a divalent oxygen (=O) or sulfur (=S) radical,
   (2) extruding said dope to form a shaped article, and
   (3) heating said shaped article for up to 160 hours at 190 to 250° C.

2. The process of claim 1 wherein said poly(p-benzamide) has an inherent viscosity of at least about 0.8, said dope comprises a liquid medium selected from the group consisting of:

N,N-dimethylacetamide,
N,N,N',N'-tetramethylurea,
N,N-dimethylisobutyramide
N-methylpyrrolidone-2 and
N,N-dimethylisobutyramide; and said extruding is through at least one orifice to form a fiber.

3. Process of claim 2 wherein said dope is provided by preparing said poly(p-benzamide) in said liquid medium and thereafter adding said modifier thereto.

4. Process of claim 1 wherein X is oxygen.
5. Process of claim 1 wherein X is sulfur.
6. Process of claim 1 wherein $n$ is 2.
7. Process of claim 1 wherein R¹, R² and R³ each contain up to 12 carbon atoms.
8. Process of claim 1 wherein Z is oxygen.
9. Process of claim 1 wherein said heating is for at least about 20 hours.
10. Process of claim 1 wherein said poly(p-benzamide) is essentially homopolymeric.

References Cited

UNITED STATES PATENTS 3,203,933    8/1965    Huffman et al.
3,225,011    12/1965   Preston et al.
3,240,758    3/1966    Smith et al.
3,472,819    10/1969   Stephens.

OTHER REFERENCES

"Progress With New Polymers," by G. A. Somers, British Rayon and Silk Journal, November 1953, pp. 62–63.

JAY H. WOO, Primary Examiner

U.S. Cl. X.R.

260—30.8, 32.4, 78; 264—184, 205, 235, 346